(12) United States Patent
Castagnos, Jr. et al.

(10) Patent No.: US 7,708,790 B2
(45) Date of Patent: May 4, 2010

(54) APPARATUS AND METHOD FOR SEPARATING SOLIDS FROM GAS STREAMS

(75) Inventors: Leonce F. Castagnos, Jr., Montgomery, TX (US); Ting Y. Chan, Bellaire, TX (US)

(73) Assignee: Lummus Technology Inc., Bloomfield, NJ (US)

( * ) Notice: Subject to any disclaimer, the term of this patent is extended or adjusted under 35 U.S.C. 154(b) by 1151 days.

(21) Appl. No.: 11/329,492

(22) Filed: Jan. 10, 2006

(65) Prior Publication Data

US 2007/0157807 A1 Jul. 12, 2007

(51) Int. Cl.
*B01D 45/12* (2006.01)

(52) U.S. Cl. .............................. 55/344; 55/424; 55/426; 55/459.1; 55/413; 55/414; 55/416; 55/418; 55/349

(58) Field of Classification Search ........... 55/413–418, 55/344–349, 424–427, 459.1; 95/271
See application file for complete search history.

(56) References Cited

U.S. PATENT DOCUMENTS

| 1,333,325 | A | * | 3/1920 | McGee | 55/338 |
|---|---|---|---|---|---|
| 4,279,624 | A | | 7/1981 | Wilson | 55/1 |
| 4,711,712 | A | * | 12/1987 | Schatz | 208/153 |
| 5,302,775 | A | * | 4/1994 | Hugues et al. | 585/639 |
| 5,372,707 | A | * | 12/1994 | Buchanan et al. | 208/161 |
| 5,514,271 | A | * | 5/1996 | Buchanan et al. | 208/113 |
| 5,538,696 | A | | 7/1996 | Raterman et al. | 422/147 |
| 5,643,537 | A | * | 7/1997 | Raterman et al. | 422/147 |
| 5,690,709 | A | * | 11/1997 | Barnes | 55/348 |
| 5,843,377 | A | * | 12/1998 | Fandel et al. | 422/144 |
| 6,673,133 | B2 | * | 1/2004 | Sechrist et al. | 55/348 |
| 6,743,401 | B2 | | 6/2004 | Guerra | 422/147 |
| 2004/0071608 | A1 | | 4/2004 | Guerra | 422/147 |
| 2006/0130443 | A1 | * | 6/2006 | Dirkse et al. | 55/345 |

FOREIGN PATENT DOCUMENTS

| FR | 2 426 499 | 12/1979 |
|---|---|---|
| WO | WO 2004/108297 | 12/2004 |

OTHER PUBLICATIONS

International Search Report and Written Opinion of the International Searching Authority.

* cited by examiner

*Primary Examiner*—Duane Smith
*Assistant Examiner*—Ives Wu
(74) *Attorney, Agent, or Firm*—Baker & Hostetler LLP

(57) ABSTRACT

Disclosed herein is a cyclone for separating fine particles from a gas. The cyclone includes a cyclone body having an upper end with an inlet and a lower end with a particulate outlet, gas outlet tube with an upper end that extends upwardly into the lower end of the cyclone body, and a vortex breaker. The upper end of the gas outlet tube is connected to the lower end of the cyclone body by a slip joint. The configuration of the cyclone provides for efficient removal of fine particles as compared to conventional techniques. A vessel containing cyclones, and methods of separation using the cyclones and vessel, also are disclosed.

3 Claims, 1 Drawing Sheet

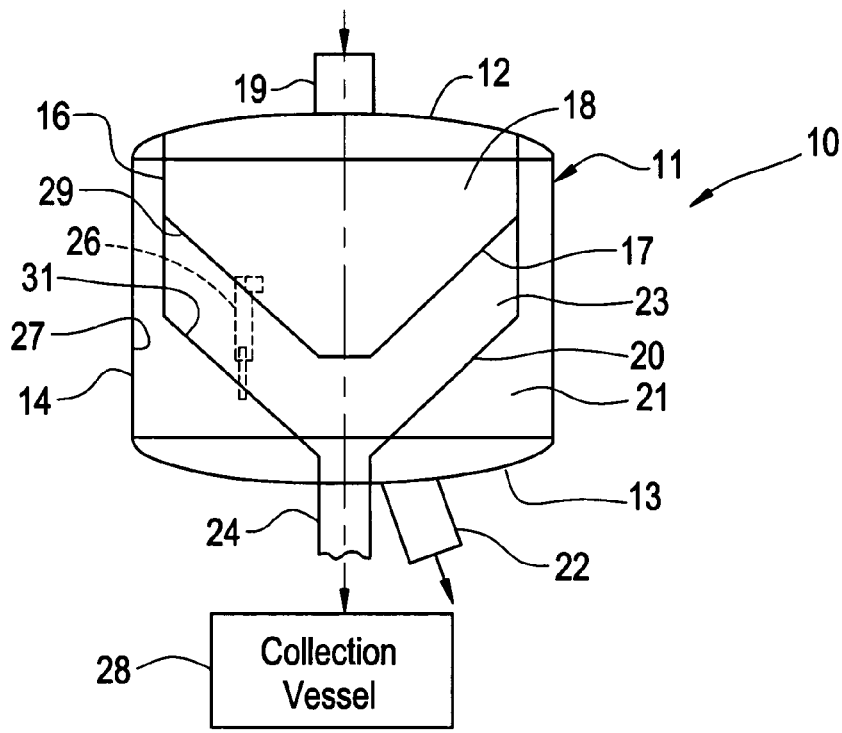
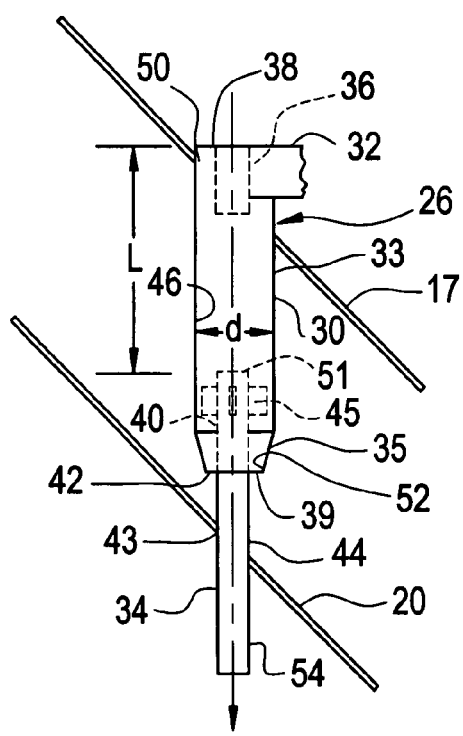
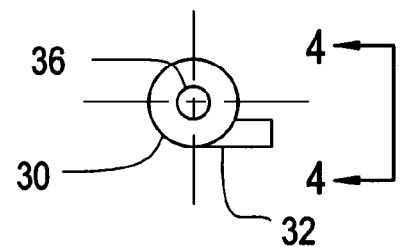
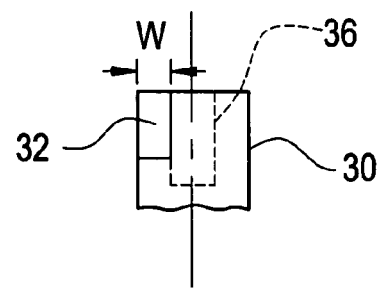

APPARATUS AND METHOD FOR SEPARATING SOLIDS FROM GAS STREAMS

BACKGROUND

The present invention relates to separation processes and more particularly to an apparatus and method for separating solids from gas streams.

In the refining and chemical process industries, as well as in other processing industries, it is often necessary to remove finely divided solids from gaseous streams. The purpose of removing solids is to either protect the environment by removing such particles before the gases are emitted to the atmosphere, or to protect downstream equipment from the erosive action of the solids. In some cases the separated solids are returned to the process while in others the separated solids are collected for disposal outside of the process.

One widely used process in the petroleum refining industry that requires the removal of small particles is the fluid catalytic cracking (FCC) process for the cracking of heavy boiling gas oil streams to produce more valuable, lighter boiling products such as gasoline and lighter gases, primarily propanes and butanes. The FCC process utilizes a solid catalyst in powder form to facilitate the breaking of the carbon-carbon atomic bonds of the gas-oil feed to form smaller molecules that lie within the gasoline boiling range. In addition to the gasoline product, the process also produces substantial yields of lighter gases such as propanes and butanes that are recovered and converted to valuable products. Fluid catalytic cracking is the most widely used "conversion" process in petroleum refining and many millions of barrels per day of FCC capacity have been installed since the process inception in the early 1940's. As such, the FCC process is of great economic value and is typically the most profitable unit in a petroleum refinery in the United States as well as in most refineries around the world.

The catalyst used in the FCC process typically is a finely divided solid composed of mostly silica and alumina in both crystalline and amorphous form. The use of a powdered catalyst has been the key feature contributing to the success of the FCC process and has lead to the development of an entire area of process operations that has come to be known as "fluidization". The finely divided powdered catalyst can be made to behave as a fluid when it is properly aerated or "fluidized" by means of air or another gas. The fluidized powder can be made to flow in lines and will establish a level within a vessel, as would a liquid. A fluidized powder will also generate a hydraulic pressure head proportional to the density and the depth of the mixture within a vessel or in a vertical standpipe as would a fluid. The powder can also be pneumatically transported by a gas stream when the gas has sufficient velocity. The ability of the powdered catalyst to flow between vessels has been of tremendous benefit in the development of a viable catalytic cracking process. Earlier attempts to use a fixed bed of catalyst pellets were largely handicapped by the need to regenerate the catalyst frequently to remove deposits of "coke" that are a by-product of cracking. The coke, which is mostly carbon with some hydrogen and sulfur, deactivates the catalyst and must be removed by means of a combustion step using air. In contrast, when a "fluidizable" catalyst is used, the catalyst can be continuously circulated between the reaction and regeneration vessels of a FCC unit so that there is no need for a cyclical process in order to accomplish the reaction and regeneration steps.

One major disadvantage in the use of a finely divided, powdered catalyst is that a portion of the catalyst remains suspended in the gas streams as the gas streams leave the reaction and regeneration vessels. The majority of the suspended catalyst solids must be removed before the gases exit the vessel. Otherwise, the catalyst will be so rapidly lost from the process that its use would be impractical.

The separation of the solid catalyst particles from the reaction products and from the regeneration flue gases in FCC processes is accomplished by means of centrifugal separation devices known as cyclones. The use of such centrifugal separators, or cyclones, for the purpose of removing solids from gaseous streams is well known. Cyclone separators work on the principal of creating a rapidly rotating vortex so as to induce a centrifugal force on the solids-bearing gas stream. The centrifugal force causes the entrained solids to concentrate on the wall of the cyclone body where they are slowed by friction and are thereby caused to separate from the gas stream.

In its simplest form, the typical cyclone separator consists of a vertical cylindrical body topped by a flat roof and having a conical lower section. The gas plus entrained solids enter at the upper part of the cylinder through a rectangular inlet duct that is tangential to the cylindrical body. The horizontal orientation of the tangential inlet causes the gas and solids to begin a rapid circular motion in the cyclone body that imparts a centrifugal force on the entrained solids. The solids move laterally through the rotating gas stream to the wall of the cyclone body. The rotating gas plus solids next enter the conical section of the lower cyclone where the tapered wall of the cone forces the downwardly moving solids and gas to move towards the center at the narrow end of the cone. At the end of the cone is a circular outlet duct to receive the separated solids. As the solids are separated from the gas and slowed by friction at the cylindrical wall of the cyclone body and in the tapered conical section, the action of gravity causes to solids to flow downwardly and into the solids outlet duct. The solids outlet duct generally extends a considerable length downward into the main vessel so that the recovered solids are returned well into the "active" reaction zone or "active" regeneration zone from which they were first entrained. These solids return ducts are termed "diplegs" and they are commonly sealed by means of a flapper valve or else they discharge directly into a bed of fluidized catalyst that acts as a seal. The flapper valve and/or bed seal serves as a simple check valve that lets the recovered solids flow out but prevents excessive backflow of gas from the vessel into the dipleg.

The rotating action of the entering gas and entrained solids in the cyclone body and lower cone of the cyclone separator forms a strong "vortex" that imparts the centrifugal force that causes the solids to move laterally to the wall. The gas outlet of the cyclone is a cylindrical tube that extends partway down into the cyclone body from the center of the cyclone roof. Therefore, to exit the cyclone, the rotating gas column must form another smaller, inner vortex that spirals upwardly to enter this gas outlet tube. Thus, in the typical cyclone separator there is an outer vortex in which the gas and solids spiral downwardly during which time the majority of the solids are forced to the wall by centrifugal action. The gas spiral must then undergo a reversal of direction and spiral back upwardly in the smaller inner vortex to enter the gas outlet tube at the roof of the cyclone. It is a common belief that there is a continuous flux of gas across the interface between the outer and inner vortices. The outer vortex loses gas to the inner vortex as it spirals downwardly and grows weaker and the inner vortex gains gas from the outer vortex as it spirals upwardly and grows stronger.

Cyclone separators have been developed over many years of use. The typical FCC reaction vessel will contain either two stages of cyclone separators or another type of primary separation device plus a single-stage cyclone system. The typical FCC regenerator will contain a two-stage cyclone system. Because of the large volume of gases that must be handled in the FCC reactor and regenerator, most units will have multiple sets of cyclones housed within the reaction and regeneration vessels. Typically the separation efficiency of an FCC cyclone system will exceed 99.99%. Still, some of the catalyst fines entrained in the cracked vapors leaving the reaction system or in the flue gases leaving the regeneration zone will not be captured in a two-stage cyclone system. Particulate material in the atmosphere, in particular very fine solids, can raise environmental issues. As a result, the emission of these fine solids to the atmosphere with the flue gas has come under increased scrutiny from environmental regulators during recent years. The presence of excessive catalyst fines in the reaction product can also cause problems for refiners by plugging downstream processing equipment or by making it difficult to produce a saleable product.

A typical FCC unit catalyst includes particles having a range of sizes from less than 20 microns to about 160 microns, with the average particle size being about 70 to 80 microns. The two-stage cyclone systems in most FCC units cannot retain catalyst fines smaller than about 20 microns for an extended period. These two-stage cyclone systems are generally housed within the reactor vessel (sometimes called a Disengager) or in the regenerator vessel. The catalyst captured by these systems is continuously returned directly to the FCC circulating inventory by means of the cyclone diplegs.

The flue gas leaving a FCC regenerator after two stages of cyclones will generally contain from 200 to 300 mg/Nm3 of catalyst fines. In many countries, the catalyst emissions are required to be below 50 mg/Nm3. As a result, a number of refiners have added an additional level of catalyst recovery to the FCC regenerator flue gas system to either meet the stringent requirements on solids emissions to the atmosphere or to protect downstream equipment. These additional levels of catalyst recovery consist of electrostatic precipitators (ESP), wet scrubbers, or another stage of centrifugal separators (cyclones). Electrostatic precipitators and scrubbers are used for the final cleanup of the flue gas before it goes to atmosphere and are capable of cleaning the flue gas to very low levels of solids, e.g., in the range of 10 to 20 mg/Nm3 of solids or less. However, precipitators and scrubbers are expensive to install and generally operate at relatively low pressures and/or temperatures relative to the flue gas exiting a FCC unit regenerator. Therefore, an electrostatic precipitator or scrubber cannot be used to protect an FCC unit flue gas power recovery system that operates at the unit pressure and relatively high temperature, which is generally in the range of 1200 to 1350 Deg. F. For this purpose refiners have employed an additional stage of high efficiency cyclones housed in a separate vessel downstream of the FCC regenerator vessel. Because these cyclones are in addition to the two stages of cyclones internal to the regenerator, they commonly go by the name of "third-stage separators" or TSS. The catalyst fines captured in these external flue gas separators are almost always discarded, as they are too small to be retained for very long in the circulating catalyst inventory.

Known third-stage separator systems employ multiple cyclone elements that are generally housed in a separate containment vessel. A third-stage system has the challenging task of trying to recover additional solids from a gas stream that has already been processed through two stages of cyclones. The particle size of the solids entering these systems is generally of less than about 30 microns and will sometimes be less than 20 microns. To recover additional solids from the flue gas exiting the FCC regenerator, a third-stage separator will generally use multiple cyclone elements that are smaller than the primary and secondary cyclones in the regenerator vessel. Smaller diameter cyclones are more efficient because, for a given gas inlet velocity, the centrifugal forces generated by the rotating gas are much higher due to the tighter radius and the solids have a much shorter path length to the wall.

A number of different cyclone designs are in operation in TSS systems. All use single-stage cyclonic elements. Some third-stage separators use conventional cyclone configurations similar to, but of generally of smaller diameter than, the primary and secondary cyclones in the regenerator vessel. Another commonly used third-stage system is that developed by Shell Oil Co. and referred to as a Shell Separator. This system uses small diameter cyclonic elements attached between an upper and a lower tube sheet. The cyclonic elements use an axial entry rather than a tangential entry as on a conventional cyclone. Swirl vanes are used in the axial gas entry to start the rotational motion of the gas. Although the cyclones are straight-sided with no cone section, they operate in a manner similar to a conventional cyclone in that the gas inlet and outlet are on the top side of the cyclone and the gas vortex must reverse direction in going from the inlet to the gas outlet. These cyclones are generally thought to operate with an efficiency of between 40 to 60% in removing the catalyst fines from the regenerator flue gas. The Shell separator is normally able to protect the downstream equipment, e.g. a flue gas turbo-expander, from the most damaging catalyst fines, i.e., those larger than about 10 microns. However, it is not able to consistently meet the more stringent emissions standards for flue gas discharged to the atmosphere.

Additional designs for cyclonic elements in TSS separators have recently been introduced that claim to be more efficient than the Shell Separator. U.S. Pat. No. 6,673,133 discloses a cyclone design that uses an axial inlet and is unidirectional in terms of the vortex flow, i.e., the vortex is formed at the top of the cyclone and exits the bottom and is not forced to change direction. In addition to the unidirectional flow, the improvement in efficiency also is said to be due to the configuration of the solids outlet. As is shown in FIG. 1b of U.S. Pat. No. 6,673,133, the solids outlets consist of multiple vertical slots located on the sides of the cyclone below the level of the gas outlet tube. The directional orientation of the slots and the pressure drop across the slots are also claimed to be important for increased efficiency. However, there are several disadvantages of this arrangement. More specifically, the slots are complex to construct, the slots may be subject to plugging, and there is a rigid connection between the gas outlet tube and the cyclone body.

It would be useful to develop an apparatus of simple construction and efficient operation that can achieve better separation than prior known fine particle separators such as third stage separators.

SUMMARY

An object of the embodiments disclosed herein is to provide a fine particle separator that has a better degree of separation and more efficient operation than prior known fine particle separators.

Another object is to provide a new and improved third stage separator for use in separating FCC catalyst particles from flue gases.

An apparatus is provided herein for the separation of finely divided solids from a gas stream with recovery of the solids for disposal and production of a clean gas that can be discharged to the atmosphere or safely processed in additional downstream equipment. In one embodiment, a cyclone for separating components of a stream comprises a cyclone body having an upper end with an inlet and a lower end with a particulate outlet, a gas outlet tube having an upper end extending upwardly into the lower end of the cyclone body, the upper end of the gas outlet tube being connected to the lower end of the cyclone body by a slip joint, and a vortex breaker disposed within the lower end of the cyclone body. In many cases, the particulate outlet is connected to a sealed solids collection vessel. In some cases, the particulate outlet is configured to remove particulars in an underflow gas.

The cyclone sometimes includes a centering device configured to center the gas outlet tube within the cyclone body. Often, the vortex breaker forms the centering device. The vortex breaker can be formed on the gas outlet tube.

A vortex former can be positioned at the upper end of the cyclone body. The cyclone body often has a tangential inlet. In many cases, the cyclone is configured to separate solid particles having a diameter of about 30 microns or less from a gas.

Another embodiment is an apparatus for separating fine particulate solids from gas comprising a housing having an upper wall, a lower wall, and a side wall defining an interior space, the housing further including an inlet, a gas outlet, and a solids outlet, a plurality of baffles dividing the interior space into an upper chamber, a middle chamber and a lower chamber, the baffles being configured to promote the downward movement of solids, and a plurality of cyclones disposed in the housing. Each cyclone includes a cyclone body having an upper end with a cyclone inlet and a lower end with a particulate outlet, a gas outlet tube having an upper end extending upwardly into the lower end of the cyclone body, the upper end of the gas outlet tube being connected to the lower end of the cyclone body by a slip joint, and a vortex breaker disposed within the lower end of the cyclone body.

In some cases, the plurality of baffles include a tubular first baffle vertically disposed in the housing and extending downwardly from the upper wall, a conical second baffle extending downwardly and inwardly from the vertical first baffle, and a conical third baffle positioned below the second baffle and extending downwardly and inwardly from the first baffle. The first and second baffles typically are configured to direct an entering gas-solids mixture into the cyclone inlet. The third baffle typically is configured to direct purified gas into the gas outlet tube. In some cases, the solids outlet of the housing is configured to receive a portion of the gas. In some cases, the gas outlet tube is configured to receive substantially all of the gas. In certain embodiments, the slip joint is formed by the baffles.

Another embodiment is a method of separating fine solids from a gas stream comprising feeding the stream to a separation apparatus comprising a plurality of cyclones, each of which includes a cyclone body having an upper end with an inlet and a lower end with a particulate outlet, a gas outlet tube having an upper end extending upwardly into the lower end of the cyclone body, the upper end of the gas outlet tube being connected to the lower end of the cyclone body by a slip joint, and a vortex breaker disposed within the lower end of the cyclone body. The gas outlet tube usually has a gas outlet velocity that is 1.0 to 1.5 times the inlet velocity. The cyclones are disposed in a housing containing baffles configured to promote the downward movement of solids and gas.

BRIEF DESCRIPTION OF THE DRAWINGS

FIG. 1 is a schematic, side elevational view of a fine particle separation system according to the present invention;

FIG. 2 is a schematic, side elevational view of a cyclone element according to the present invention;

FIG. 3 is a top view of the cyclone element of FIG. 2; and

FIG. 4 is a side elevational view of the gas outlet duct taken along line 4-4 of FIG. 3.

DETAILED DESCRIPTION

The embodiments disclosed herein can be employed in any application in which finely divided solids are to be removed from a gaseous stream. The invention is particularly advantageous for use as a third stage separation system for removal of catalyst fines from regeneration flue gas in FCC units, but the scope of the invention is not limited to such use.

Generally stated, the apparatus includes an upright cylindrical vessel with a plurality of cyclonic elements positioned and oriented within the interior space of the vessel. The vessel is divided by interior baffles into at least three separate chambers. The upper chamber serves as an inlet plenum area for the cyclonic elements; the middle chamber serves as a collection area for the separated solids; and the lower chamber serves as a plenum for collection of the clean gas discharge from the cyclone elements. The baffles are sealed against the vessel wall by appropriate means and the surface of the baffles is angled so that the collected solids will slide freely down the baffles under the action of gravity. The upper chamber of the vessel is connected to an inlet line that conducts the gas and solids to be cleaned into the vessel. The lower chamber of the vessel is connected to an outlet line that conducts the cleaned gas away from the vessel to be further processed. The middle chamber of the vessel is connected to an outlet duct that penetrates the bottom head of the vessel and conducts the separated solids out of the vessel under gravity flow. The three chambers of the vessel are completely sealed from each other so that no gas or solids can flow from one chamber to the next except along the flow paths formed by the cyclone elements.

The bodies of the cyclone elements penetrate the upper baffle so that the inlet ducts of the cyclonic elements are located in the upper chamber of the vessel. The penetrations of the cyclone elements through the upper baffle are sealed so as to prevent any leakage of gases past the baffle without entering the cyclone elements. Thus, the upper baffle acts as a tube sheet to force the entering gas plus solids into the cyclone inlet ducts. The gas plus solids entering the cyclone elements are forced to undergo a spinning motion by the tangential orientation of the inlet duct. The spinning motion of the gas forces the solids to move to the wall of the cyclone elements where they are slowed by friction and move downwardly along the wall under the action of gravity. The bodies of the cyclone elements are open to the middle chamber of the vessel and the separated solids fall freely into this chamber under the action of gravity. Once free of the cyclone bodies the separated solids fall to the surface of the lower baffle, which is angled so that the solids will continue to slide to the center of the vessel. At the center of the vessel the solids enter the solids outlet line that exits the vessel through the bottom head.

In one embodiment the solids are collected in a separate vessel located below the third stage separator. The collection vessel is sealed so that no flow of gas accompanies the solids. In another embodiment, a portion of the gas is drawn out of the solids collection line along with the separated solids. This gas flow that accompanies the solids in this embodiment is commonly referred to as "underflow" and is typically from about 1% to about 5% of the entering gas stream. The underflow thus comprises a concentrated gas plus solids stream and the percentage of gas withdrawn is controlled by external means, such as by a properly sized restriction orifice or flow nozzle. The underflow can be further processed to recover the solids by means of an additional cyclonic element or filtration system. If the third stage separator is being used only to protect downstream equipment, the underflow can be recombined with the clean gas stream downstream of the downstream equipment without recovering the separated solids.

Each of the cyclone elements is equipped with a gas outlet tube that projects into the cyclone body of the cyclone elements along the center axis of the cylindrical body. The circular annular area between the gas outlet tubes and the cyclone body forms the outlet flow area for the separated solids. The outlet tubes are sized so that the spinning gas is forced into a tight vortex in order to enter the smaller diameter of the gas outlet tube. The conservation of angular momentum causes the rate of spin to increase as the vortex enters the gas outlet tube, thus enhancing the separation of solids from the exiting gas stream. Unlike a traditional cyclone separator with the tangential gas inlet at the top and the gas outlet tube in the roof, in the cyclone elements used herein, the vortex is not required to undergo a directional change. The vortex spirals downwardly in one direction from inlet to outlet.

Referring first to FIG. 1, one embodiment of a solids separation apparatus is shown and is designated as 10. The solids separation apparatus 10 includes a cylindrical upright vessel 11 having a top head 12, a bottom head 13 and a cylindrical side wall 14. The vessel 11 forms a gas tight housing for the multiple cyclone elements 26. The vessel 11 is subdivided by internal tube sheets or baffles into three separate chambers. An inner baffle 16, which preferably is configured in the shape of a hollow cylinder, forms a vertical wall suspended from the top head 12 that supports the other baffles. Conical upper baffle 17 and the vessel top head 12 define an upper chamber 18 within inner baffle 16 that forms an inlet plenum for the gas and solids entering through vessel inlet duct 19. Conical lower baffle 20, the inner surface 27 of side wall 14 and the vessel bottom head 13 form a lower chamber 21 that serves to collect the clean gas from the cyclone elements 26 and conducts the gas into a clean gas outlet duct 22. A middle chamber 23 is defined by upper baffle 17, lower baffle 20, and inner baffle 16. The middle chamber 23 is configured to receive solids from the cyclone elements 26 and is connected to a solids outlet duct 24.

Multiple cyclone elements 26 are supported by upper baffle 17 and lower baffle 20. The baffles 14, 17 and 20 are sealed at all connection points and are also sealed to the individual cyclone elements 26 such that no gas or solids can flow between the vessel chambers except by means of the flow paths through the cyclone elements 26.

Upper baffle 17 and lower baffle 20 are angled inwardly and downwardly in an amount sufficient to cause the solids that accumulate in the middle chamber 23 to slide downwardly along the top side 31 of lower baffle 20 toward the center of vessel 11 under the action of gravity. Solids that collect on the top side 31 of lower baffle 20 will thus be conducted into the centrally located solids outlet duct 24 that exits the vessel through the bottom head 13. The angles of the surfaces of baffles 17 and 20 will typically be between about 30 degrees and about 60 degrees from the vertical with the most preferred angle being about 45 degrees.

In one embodiment, the solids collected in the middle chamber 23 of the vessel are conducted into a solids outlet duct 24 that is connected to a sealed collection vessel 28 such that no gas flows into the solids outlet duct 24 with the collected solids. In another embodiment, some gas is drawn into the middle chamber 23 with the solids and accompanies the solids into the solids outlet duct 24 and the collection vessel 28. Such gas flow, termed underflow, is controlled by external means downstream from the solids outlet duct 24. The flow control means for the underflow gas is typically a restriction orifice or flow orifice, but other flow control means may also be employed. The gas plus solids underflow stream can be further treated to remove the solids in external equipment not shown herein. Such further treatment typically consists of an additional cyclone separator (fourth-stage cyclone) or a filtration system. The solids collected in either embodiment are typically discarded since the particles are usually too small to be reused in the process.

The vessel 11 can be made of any suitable material, and typically has a carbon steel exterior with an interior insulated lining. The vessel 11 typically has a diameter in the range of 6-30 feet. The vessel 11 usually contains about 10-300 cyclone elements 26, which typically, but not necessarily, are made of carbon steel or the like. The cyclone elements 26 often, but not necessarily, each have a diameter in the range of 6-18 inches. The baffles are made of a material that is sufficiently strong to support the cyclone elements 26.

FIG. 2 is a schematic, side elevational view of one of multiple cyclone elements 26 included in the vessel 11 which is shown in FIG. 1. The cyclone elements 26 each have a hollow cyclone body 30 and a tubular gas outlet duct 34. The cyclone body 30 is mounted in an aperture 50 in the upper baffle 17 in a vertical orientation. The gas outlet duct 34 is mounted in an aperture 43 in the lower baffle 17 in a vertical orientation. The cyclone body 30 and gas outlet duct 34 are not rigidly fixed to each other.

An inlet 32 for gas and entrained solids is formed at the top of the cyclone body. Usually, the inlet 32 has a rectangular cross section. The solids outlet 39 is an annular opening at the lower end of the cyclone body 30 formed by the inner wall 52 of the cyclone body 30 and the outer wall 54 of the gas outlet duct 34.

The cyclone body 30 includes an upper portion 33 with a generally cylindrical cross section and a lower portion 35 that is inwardly tapered in the downward direction. Gas plus entrained solids enter the cyclone body 30 through inlet 32, which preferably but not necessarily is positioned in a tangential relation to the upper portion 33 of the cyclone body 30. The tangential orientation of the inlet 32, shown in FIGS. 2-4, causes the gas and solids to begin a spinning motion inside the cyclone element 26. The spinning motion and formation of a gas vortex inside the cyclone element 26 are enhanced by the inclusion of a vortex former 36 that confines the inlet gas to an annular area between the inner wall 31 of the cyclone and the axially positioned vortex former 36. The vortex former 36 usually is cylindrical in shape. The vortex former 36 contributes to the improved overall collection efficiency of the device. The force of the vortex causes the gas to move to the center of the cyclone body 30 as the solids move to the inner wall 46 of the cyclone body 30.

The spinning gas vortex that forms inside the cyclone element 26 tapers from the full inner diameter d of the upper portion 33 of the cyclone body 30 at the inlet 32 to the diameter of the gas outlet 34. This tapering of the vortex to a smaller diameter causes the rotational speed of the gas to increase as the gas approaches the gas outlet 34 since angular momentum is conserved. The increase in velocity helps to improve the solid-gas separation efficiency of the cyclone.

Another significant feature of the embodiment shown in the Figures is the configuration of the gas outlet duct 34. The upper portion 40 of the gas outlet duct 34 projects into the cyclone body 30 through the lower end 42 of the cyclone body 30, as is shown in FIG. 2. The lower portion 44 of the gas outlet duct 34 extends through the aperture 43 in the lower baffle 20. The area between the aperture 43 and the gas outlet duct 34 is tightly sealed to prevent any flow of gas or solids around this connection. However, as indicated above, the gas outlet duct 34 has no rigid connection to the cyclone body 30 and is allowed to move vertically up or down relative to the cyclone body 30. Thus, the gas outlet duct 34 and the cyclone body 30 move relative to one another when the gases being processed are at high temperature or when the system is heated or cooled unevenly. The connection between the cyclone body 30 and the gas outlet duct 34 constitutes an expansion joint that allows for vertical telescoping motion between the cyclone body and the gas outlet duct, and thus forms a slip joint. The connection is made through the lower baffle 20, which is connected to the gas outlet duct 34 and the upper baffle 17, which is connected to the cyclone body 30. Both the lower baffle 20 and the upper baffle 17 are connected to the inner baffle 16. Due to the inclusion of an expansion joint having this configuration, no bellows-type expansion joint is required.

The gas outlet duct 34 has a series of thin centering tabs 45 extending radially outward from its outer surface to keep the gas outlet duct 34 centered within the cyclone body 30 while allowing for vertical slip between the cyclone body 30 and the gas outlet 34. The centering tabs 45 allow for a close fit within the cyclone body 30 but still allow the gas outlet 34 to move freely up or down within the cyclone body 30. The centering tabs 45 also act as a vortex breaker for the separated solids. The separated solids will move in a downward spiral along the inner wall 46 of the cyclone body 30. The centering tabs 45 act to break the spiral motion of the solids and rob them of energy, thus helping them to fall to the surface of the lower baffle 20 under the influence of gravity.

Another important design feature of the cyclone is the length to diameter ratio, or L/d. As is shown in FIG. 2, the length L of the cyclone element 26 is defined to be the distance from the inside of the cyclone roof 38 to the beginning of the gas outlet duct 34. The diameter d of the cyclone element 26 is defined to be the inside diameter of the upper portion 33 of the cyclone body 30. A longer cyclone, i.e., greater L/d, will be more efficient because the greater vortex length will provide more time for solids to move to the wall under the action of the applied centrifugal force. In the preferred embodiment the L/d will be greater than about 3, more preferably above 4, and most preferably above 5.

Several design parameters that influence the separation efficiency of cyclone separators are the inlet velocity, the gas outlet velocity, and the ratio of the barrel area to cyclone inlet area. A high inlet velocity results in higher centrifugal forces acting on the solids entrained within the incoming gas stream. However, too high an inlet velocity can result in excessive erosion from solids impacting and scouring of the internal surfaces. In the preferred embodiment, the cyclone inlet velocity is between about 50 feet per second and 140 feet per second, and typically will be 70 to 90 feet per second. The inlet velocity is set by the cross sectional area of the inlet 32, the volumetric flow of gas to be processed, and the number of cyclone elements 26. The cross sectional area of the rectangular inlet 32 is set by the width and height of the internal surface of the inlet 32. The internal width w of the inlet 32 usually does not exceed the width of the annular area between the inner wall 46 of the cyclone body 30 and the vortex former 36.

The cyclone gas outlet velocity is controlled by the internal diameter of the gas outlet duct 34. A smaller diameter for the gas outlet duct 34 will force the gas vortex within the cyclone body to taper to a smaller diameter and will speed up the rotational velocity of the vortex at the gas outlet duct 34. The width of the annular space between the cyclone body 30 and the gas outlet duct 34 will also be greater, providing more area for the flow of separated solids. Also, a greater distance between the inner wall 46 of the cyclone body 30 and the gas outlet opening 51 will reduce the possibility of the downwardly moving solids being re-entrained in the gas stream as the gas moves into the gas outlet duct 34. In the preferred embodiment, the gas outlet velocity will be from 1.0 to 1.5 times the gas inlet velocity and more preferably about 1.2 to 1.3 times the gas inlet velocity.

The ratio of the cyclone barrel area to inlet area is defined to be the internal cross sectional area of cyclone body 30 divided by the internal cross sectional area of the inlet 32. In the preferred embodiment of this invention, the ratio of barrel area to inlet area is between about 4 and about 8 and is preferably above 5.

As mentioned above, inclusion of the vortex former 36 at the cyclone inlet helps establish the initial shape of the gas vortex. The expansion joint, such as a slip joint, allows the cyclone body to be rigidly attached and securely sealed to the upper baffle while the gas outlet tube is rigidly attached and tightly sealed to the lower baffle. As a result, no bellows type expansion joints are required to absorb differential thermal growth between the upper and lower baffles and the cyclone elements. The gas outlet tube also utilizes alignment tabs that act as vortex breakers for the separated solids and facilitates the settling of the solids into the collection chamber.

Various of the above-disclosed and other features and functions, or alternatives thereof, may be combined into many other different structures or methods. Various presently unforeseen or unanticipated alternatives, modifications, variations, or improvements therein may be subsequently made by those skilled in the art which are also intended to be encompassed by the following claims.

What is claimed is:

1. An apparatus for separating fine particulate solids from gas, comprising:
   (a) a housing having an upper wall, a lower wall, and a side wall defining an interior space, the housing further including an inlet, a gas outlet, and a solid outlet,
   (b) a plurality of baffles dividing the interior space into an upper chamber, a middle chamber and a lower chamber, the baffles being configured to promote the downward movement of solids, wherein the plurality of baffles include a tubular first baffle vertically disposed in the housing and extending downwardly from the upper wall, a conical second baffle extending downwardly and inwardly from the vertical first baffle, and a conical third baffle positioned below the second baffle and extending downwardly and inwardly from the first baffle; and
   (c) a plurality of cyclones disposed in the housing, each cyclone including a cyclone body having an upper end with a cyclone inlet and a lower end with a particulate outlet, a gas outlet tube having an upper end extending upwardly into the lower end of the cyclone body, the upper end of the gas outlet tube being connected to the lower end of the cyclone body by a slip joint, and a vortex breaker disposed within the lower end of the cyclone body, the vortex breaker comprising a centering device configured to center the gas outlet tube within the cyclone body.

2. The apparatus of claim 1, wherein the first and second baffles are configured to direct an entering gas-solids mixture into the cyclone inlet.

3. The apparatus of claim 2, wherein the third baffle is configured to direct purified gas into the gas outlet tube.

* * * * *